Aug. 5, 1924.                                                          1,503,484
O. F. CONKLIN
COMMUTATOR AND PROCESS OF MANUFACTURE
Filed Aug. 23, 1920          4 Sheets-Sheet 1

Witnesses
Irvin A. Greenwald
C. Dale Miller

Inventor
Oliver F. Conklin
Frederick J. Hardman
By                Attorney

Aug. 5, 1924.

O. F. CONKLIN 1,503,484

COMMUTATOR AND PROCESS OF MANUFACTURE

Filed Aug. 23, 1920    4 Sheets-Sheet 2

Witnesses
Irvin A. Greenwald
C. Dale Miller

Inventor
Oliver F. Conklin
Frederick J. Hardman
By
Attorney

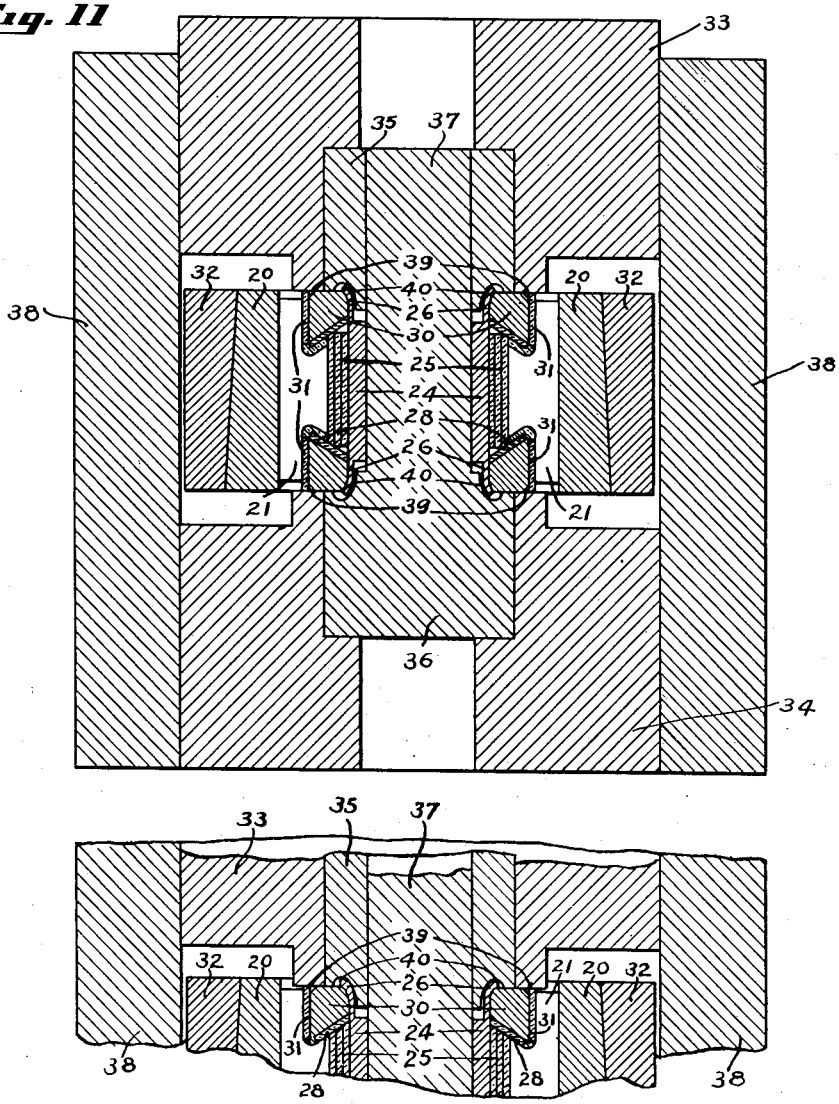

Aug. 5, 1924.

O. F. CONKLIN 1,503,484

COMMUTATOR AND PROCESS OF MANUFACTURE

Filed Aug. 23, 1920      4 Sheets-Sheet 4

Patented Aug. 5, 1924.

1,503,484

UNITED STATES PATENT OFFICE.

OLIVER F. CONKLIN, OF ANDERSON, INDIANA, ASSIGNOR TO REMY ELECTRIC COMPANY, OF ANDERSON, INDIANA, A CORPORATION OF INDIANA.

COMMUTATOR AND PROCESS OF MANUFACTURE.

Application filed August 23, 1920. Serial No. 405,438.

*To all whom it may concern:*

Be it known that I, OLIVER F. CONKLIN, a citizen of the United States, residing at Anderson, in the county of Madison and State of Indiana, have invented certain new and useful Improvements in Commutators and Processes of Manufacture, of which the following is a full, clear, and exact description.

This invention relates to commutators and has among its objects the production at low cost of commutators which will be practically free from liability to short circuit, which will withstand high speeds of rotation, and which will be otherwise efficient and reliable.

It is a further object of the invention to provide an improved process of manufacture of commutators by means of which the foregoing objects of the invention can be carried out.

Further objects and advantages of the present invention will be apparent from the following description, reference being had to the accompanying drawings, wherein a preferred embodiment of the present invention is clearly shown.

Figure 7:
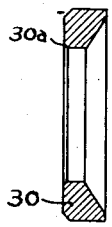
Figure 8:
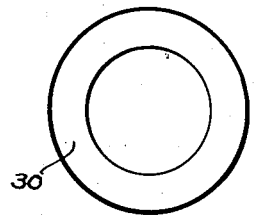
Figure 9:
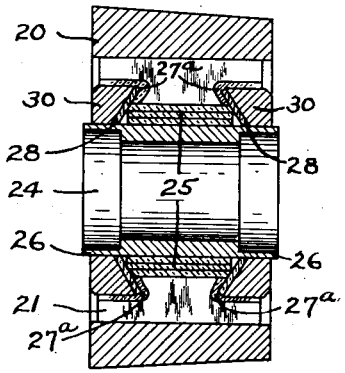
Figure 10:
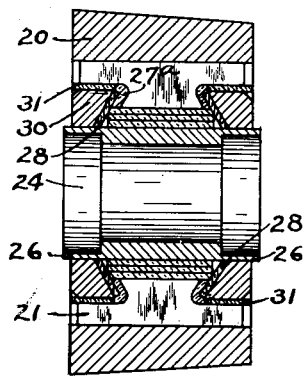

Figs. 5 and 6 and Figs. 9 to 13, inclusive, are sectional views showing the progressive stages in the manufacture of the commutators embodying the present invention;

Fig. 7 is a sectional view of one of the V-rings used in the construction of the commutator;

Fig. 8 is an end view of the same; and

Figure 14:
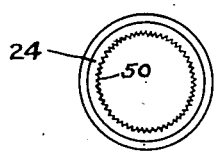

Fig. 14 is an end view of a modified form of core.

The first step in the manufacture of the invention is to assemble together in split ring 20 an annulus comprising the required number of previously formed commutator bars 21 and spacers 22 of mica or other nonconducting material. Numeral 23 designates as a whole the commutator bar assembly.

A previously formed metallic core 24 is provided with a wrapping 25 of several layers of sheet asbestos or other nonconducting material such as paper or cloth, which has previously been soaked in shellac or bakelite varnish or similar materials. The ends of the core 24 are counterbored for a certain distance to provide lips 26 for a purpose to be described.

Figure 1:
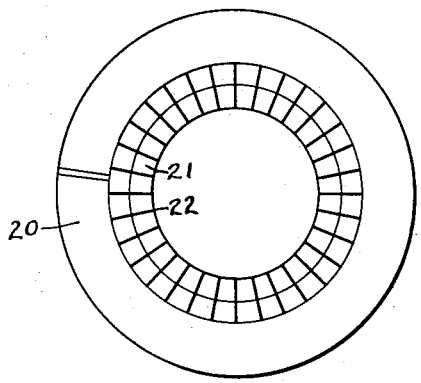
Fig. 1 is a plan view of the commutator bar assembly.
Figure 2:
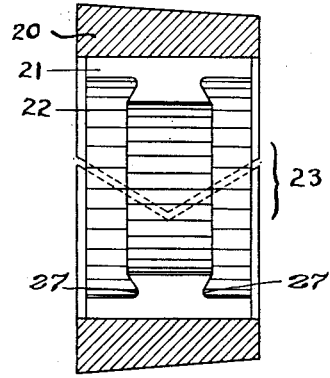
Fig. 2 is a sectional view of the same.
Figure 3:
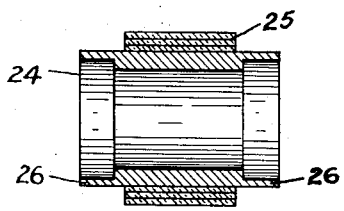
Fig. 3 is a sectional view of the commutator core provided with a wrapping of nonconducting material.
Figure 4:
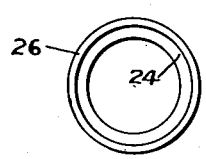
Fig. 4 is an end view of the same without the wrapping.
Figure 5:
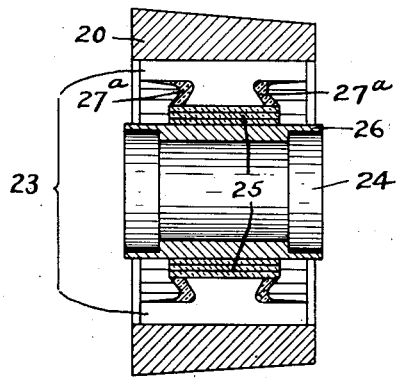
Figure 6:
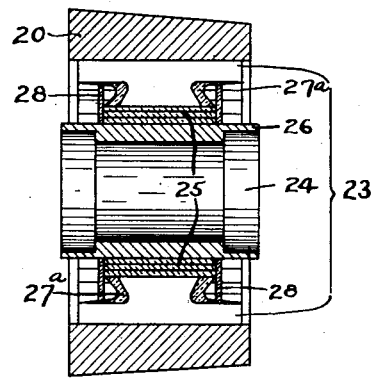

The wrapped core 24 is next assembled within the commutator assembly 23. Then the V-grooves 27 provided by the commutator bar assembly are smeared with a small quantity of very thick shellac or bakelite varnish, indicated by numeral $27^a$ of Figs. 5 and 6. Then previously formed V-groove insulation washers 28 are assembled in position as shown in Fig. 6. These washers are preferably constructed of sheet mica.

The next step is to place metallic V-rings 30 upon the core 24 and on opposite sides of the commutator assembly 23. These V-rings are shown in section in Fig. 7 and in elevation in Fig. 8. The bore of each ring is countersunk a slight distance from the outer face of the ring, as indicated by numeral $30^a$. This stage of the manufacture is depicted by the sectional view shown in Fig. 9.

The annular spaces between the outer peripheral surface of the V-rings 30 and the commutator bars 21 are filled up by winding in bands of sheet mica or micarta or other insulating material about the outer peripheral surfaces of the rings. These bands are indicated by numerals 31 in Fig. 10, which illustrates the stage of manufacture up to this point.

The outer surface of the split ring 20 is tapered so that it may be wedged by means of suitable press tools within the internally tapered ring 32, as shown in Fig. 11. During this operation the commutator bars 21 and mica inserts 22 are tightly squeezed together, and since the outward expansion of the ring 20 is prevented pressure may be applied to the V-rings 30 in the manner indicated in Fig. 11.

The assembled parts are next placed between forming die blocks 33 and 34, block 33 including a detachable portion 35, and block 34 a detachable portion 36 having an extension 37 which centers the core 24, and the block 33. Blocks 33 and 34 are constructed to slide within and be guided by the sleeve 38. Each die block is provided with a plane surface 39 and a curved surface of revolution lying partly on opposite sides of the plane surface 39.

Pressure is applied axially of blocks 33 and 34 causing the plane surfaces 39 to engage the outer faces of rings 30 and the surfaces 40 to engage the lips 26 of core 24 and to adjust the core 24 so that the lips 26 project equal distances through the rings 30. As the pressure is increased the lips 26 will commence to curl equally about the rings 30 as shown in Fig. 11. Sufficient pressure is applied to cause the upsetting of lips as shown in Fig. 12 so that the rings 30 will be maintained with sufficient pressure against the insulation to cause the same to fit snugly against the commutator bars and core 24.

When this stage of manufacture is completed a sectional view of the entire assembly will be substantially as indicated in Fig. 12. The V-rings 30 should be set up firmly enough so that the varnish 27ª will flow and fill up the crevices in the commutator. The core insulation 25 will be compressed by having pressure applied to its ends so that it will fit snugly against the commutator bars 21 and the mica inserts 22.

The ring 32 with all of the parts assembled therein is removed from the blocks 33 and 34 and is placed in an oven and baked at about 275° Fahrenheit to 300° Fahrenheit for approximately one-half hour. This temperature is sufficient to cause the insulating varnish to volatilize and to expand and fill the crevices between the commutator bars and the non-conducting spacers, washers and bands. This initial baking operation is continued long enough to insure the filling of the crevices, but not long enough to bake the varnish hard.

Figure 13:
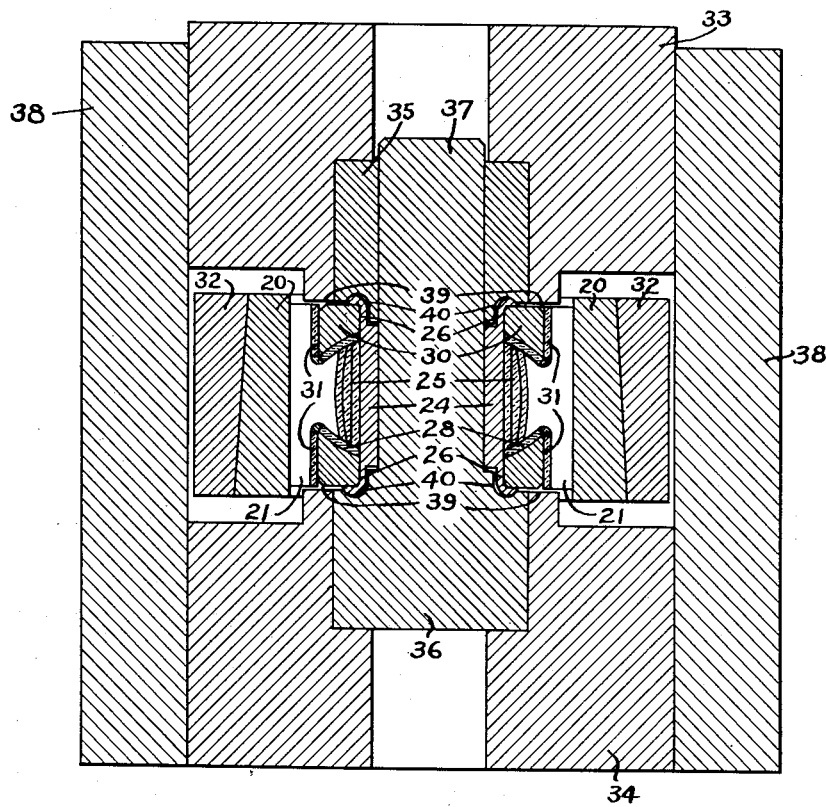

The next step in the manufacture of the commutator is to remove the ring 32 and commutator assemblage from the oven, and, while the commutator is still hot, to place it again between the blocks 33 and 34 and to apply axially of the blocks a pressure greater than the initial pressure. Under this pressure, the plane surfaces 39 continue to force the rings 30 very firmly into position until the surfaces of revolution 40 are substantially entirely engaged by the curled lips 26 of the core 24. Then as the pressure is still increased, the plane surfaces 39 will be backed away from the rings 30, while the lips 26 continue to be curled over and reversely bent back against the rings 30, as shown in Fig. 13. This sort of swedging operation causes the V-rings to be secured very firmly without breaking or cracking the edges of the core 24, and also prevents the V-rings "backing off" when the pressure is released. During the final press operation the insulating varnish is squeezed still further into the minute crevices or pockets between the parts of the commutator to assist in making a firm bond.

After this final press operation the commutator is removed from the press and baked at 225° Fahrenheit to 250° Fahrenheit for at least three hours. This final baking operation assists in drying out the varnish and in volatilizing the surplus varnish which may ooze out during the final press operation.

After this three hour period of baking, the fire in the baking oven is turned out, but the commutator remains in the oven to cool off gradually. This gradual cooling off process assists to prevent cracking the varnish.

In order that the commutator may be conveniently assembled upon an armature shaft, the core 24 before being assembled within the commutator assemblage is internally knurled or broached as indicated by numeral 50 in Fig. 14. The commutator when completed may then be forced on to an armature shaft with a press fit. The teeth which are cut during the broaching operation upon the internal cylindrical surface of the core 24 will dig into the armature shaft and will thereby provide a very effective driving connection between the armature shaft and the commutator.

Instead of the core wrapping 25 being constructed of asbestos soaked with varnish a form of condensite known on the market as 147 plastic condensite can be used. For this use it should be rolled into a sheet of the required thickness and wrapped around the core 24.

During the final press operation the pressure applied should be sufficient to cause the copper commutator bars 21 to be slightly distorted at the ends in order that they will indent into the core insulation 25. This distortion is clearly shown in Fig. 13.

The initial and final pressure will vary according to the materials used. It has been found satisfactory to use upon a commutator having an external diameter of one and three quarter inches, an initial pressure of 6 to 10 tons and a final pressure of 13 to 15 tons.

While the core wrapping 25 supports the bars 21 to a certain extent it also acts as a dam to prevent the liquid insulation from flowing in excessive amounts between the bars 21 and the core 24 and to cause the liquid insulation to flow, when pressure is applied to the clamping rings, between the clamping rings 30, insulation 31 and the bars 21. When this liquid insulation is hard, it cooperates with insulation 31 to support the outer ends of the bars 21.

Clamping the assembled commutators together with the split ring prior to the placing of the commutator in the press facilitates complete assembly work on a bench and the handling of the commutators throughout the process. The contracting of the split ring to force the annulus of commutator bars substantially into final position assists in holding the several parts of the commutator in their relative positions during the heat treating of the insulating material, which treatment first renders this material plastic, and during the forcing of the end clamping rings 30 into final positions.

While the device and process herein shown and described constitute a preferred form of embodiment of the invention, it is to be understood that other forms might be adopted, all coming within the scope of the claims which follow.

What I claim is as follows:

1. The method of making commutators which comprises assembling an annulus of commutator bars, a hollow core located centrally of the annulus, and independently movable clamping rings located on the core and adapted to engage the annulus of bars; applying pressure initially directly to the clamping rings to force them against the annulus while centering the core with respect to the annulus and rings so that the ends of the core extend the same distance outside the rings; then applying pressure to the ends of the core to cause the end edges of the core to flare outwardly and finally to be bent reversely back against the outsides of the clamping rings, the direct pressure against the clamping rings being removed as the said reverse flare against the clamping rings begins.

2. The method of making commutators which comprises assembling an annulus of commutator bars, a hollow core located centrally of the annulus, and independently movable clamping rings located on the core and adapted to engage the annulus of bars; applying pressure initially directly to the clamping rings to force them against the annulus; applying pressure to the end edges of the core to swage these edges against the clamping rings while direct pressure against the rings is maintained, but, as the flaring of the end edges of the core approaches completion, removing direct pressure from the clamping rings and applying all the pressure toward clamping rings through the flaring edges of the core to complete the flaring operation.

3. The method of making commutators which comprises assembling an annulus of commutator bars, a hollow core located centrally of the annulus, and independently movable clamping rings located on the core and adapted to engage the annulus of bars; applying pressure initially directly to the clamping rings to force them against the annulus while centering the core with respect to the annulus and rings so that the ends of the core extend the same distance outside the rings; applying pressure to the end edges of the core to swage these edges against the clamping rings while direct pressure against the rings is maintained, but, as the flaring of the end edges of the core approaches completion, removing direct pressure from the clamping rings and applying all the pressure toward clamping rings through the flaring edges of the core to complete the flaring operation.

4. The method of making commutators which comprises assembling an annulus of commutator bars, a hollow core located centrally of the annulus, and independently movable clamping rings located on the core and adapted to engage the annulus of bars; applying pressure initially directly to the clamping rings to force them against the annulus while centering the core with respect to the annulus and rings so that the ends of the core extend the same distance outside the rings; applying pressure to the end edges of the core to begin swaging these edges against the clamping rings while direct pressure against the rings is maintained; in continuing pressure against the edges of the core to cause them to flare outwardly and reversely back against the clamping rings, the direct pressure against the clamping rings being removed as the reverse bend approaches completion; and applying all the pressure toward the clamping rings through the reversely flared edges of the core to complete the reverse flaring operation.

5. The method of making commutators which comprises assembling an annulus of commutator bars, a hollow core located centrally of the annulus, and independently movable clamping rings located on the core and adapted to engage the annulus of bars; flaring the clamping rings against the annulus while centering the core with respect to the annulus and rings so that the ends of the core extend the same distance outside the rings; and in flaring the end edges of the hollow core into a reverse bend back against the outsides of the clamping rings.

6. The method of making commutators which comprises assembling an annulus of commutator bars, a hollow core located centrally of the annulus, and independently movable clamping rings located on the core and adapted to engage the annulus of bars; and in flaring the end edges of the hollow core into a reverse bend back against the outsides of the clamping rings.

7. The method of making commutators which comprises forming a substantially complete commutator structure including an annulus of commutator bars having undercut portions on its inner periphery, a hollow core, independently movable clamping rings on the core engaging the under cut portions of the annulus and heat hardenable insulating material between the core and bars; forcing the clamping rings independently and axially along the core into final position relative to the said under cut portions; and swaging the ends of the hollow core into reversely curved flaring ends bearing against the outer sides of the clamping rings.

8. A commutator comprising an annulus of commutator bars separated by nonconducting members, clamping rings bearing against the sides of the bars and a central hollow core having relatively thin end edges reversely curled back against the clamping rings, and having an intermediate portion which is relatively thick, said intermediate portion being broached or internally knurled to provide for driving engagement with a shaft.

In testimony whereof I hereto affix my signature.

OLIVER F. CONKLIN.

Witnesses:
KATHARINE WEAVER,
RODGER J. EMMERT.